R. B. EASON.
Combined Drip-Pan and Self-Oiler for Bearings.
No. 212,449. Patented Feb. 18, 1879.
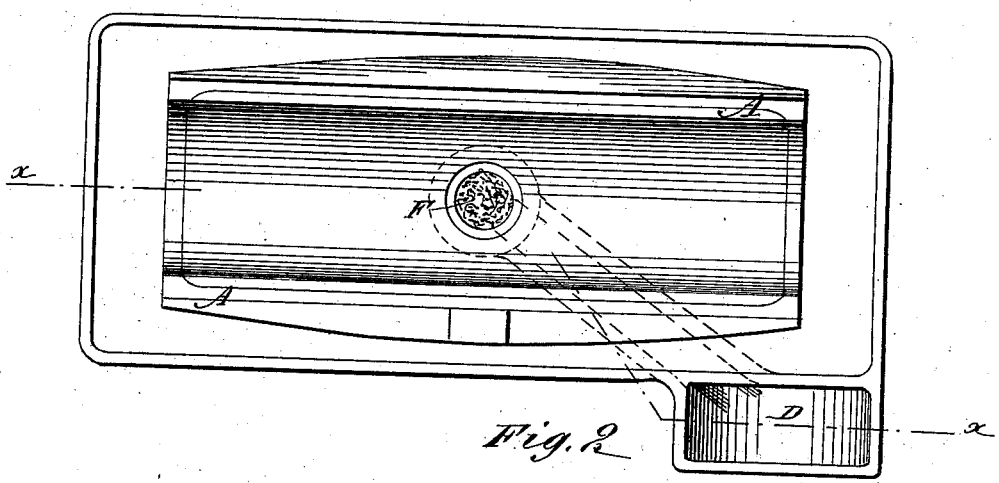
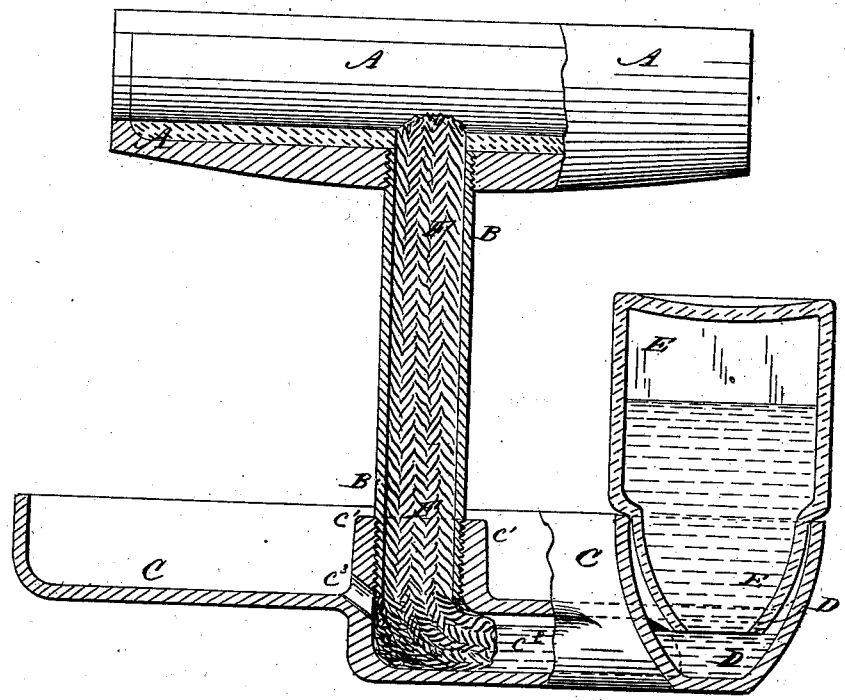
WITNESSES:
C. Neveux
C. Sedgwick
INVENTOR:
R. B. Eason
BY Munn & Co.
ATTORNEYS.

UNITED STATES PATENT OFFICE.

RICHARD B. EASON, OF NEW YORK, N. Y.

IMPROVEMENT IN COMBINED DRIP-PAN AND SELF-OILER FOR BEARINGS.

Specification forming part of Letters Patent No. 212,449, dated February 18, 1879; application filed January 9, 1879.

*To all whom it may concern:*

Be it known that I, RICHARD B. EASON, of the city, county, and State of New York, have invented a new and useful Improvement in Combined Drip-Pan and Self-Oiler for Bearings, of which the following is a specification:

Figure 1 is a top view of a shaft-bearing to which my improvement has been applied. Fig. 2 is a detail section of the same, taken through the broken line $x$ $x$, Fig. 1.

Similar letters of reference indicate corresponding parts.

The object of this invention is to furnish an improved drip-pan and oiler for shaft-bearings and other bearings, which shall be so constructed as to keep the bearing properly oiled, and at the same time conduct the oil that may drip from the ends of the bearings back to the said bearings, and which shall be simple in construction and convenient in use.

The invention consists in the combination of the tube to receive packing with the bearing, and with the drip-pan, provided with the socket, having a hole through its side, the passage, and the chamber to receive an oil-reservoir, as hereinafter fully described.

A represents the lower half of a bearing, into a hole in the middle part of which is screwed a short tube, B. The lower end of the tube B is screwed into a socket, $c^1$, formed in the middle part of the drip-pan C. From the lower end of the socket $c^1$ a passage, $c^2$, leads through a projection formed upon the bottom of the drip-pan C, and terminates in a small chamber, D, formed upon the side of the said drip-pan C. E is the oil-reservoir, which is made in the form of a bottle, and is inverted in the chamber D. In the tube B is placed a packing, F, of lamp-wick, cotton-waste, or other fibrous material, which will conduct the oil by capillary attraction from the passage or channel $c^2$ to the bearing A, the upper end of the packing F projecting far enough to be in contact with the journal. $c^3$ is a small hole leading through the lower part of the socket $c^1$ into the channel $c^2$.

With this construction, any oil that drops from the ends of the bearing A will flow through the hole $c^3$ into the passage $c^2$, and will be conducted back to the said bearing by the packing F, the reservoir E supplying additional oil as fast as required, and no faster, so that there will be no waste of oil, and the journal will be kept thoroughly oiled.

Having thus described my invention, I claim as new and desire to secure by Letters Patent—

The combination of the tube B, to receive packing, with the bearing A, and with the drip-pan C, provided with the socket $c^1$, having a hole, $c^3$, through its side, the passage $c^2$, and the chamber D, to receive an oil-reservoir, substantially as herein shown and described.

RICHARD B. EASON.

Witnesses:
    JAMES T. GRAHAM,
    C. SEDGWICK.